R. H. St John,
Hinge,
No. 112,978. Patented Mar. 21, 1871.

WITNESSES.
H. C. Elliott
Walter Allen.

INVENTOR,
R. H. St John
By Knight Bros
Attorneys.

United States Patent Office.

ROSWELL H. ST. JOHN, OF BELLEFONTAINE, OHIO.

Letters Patent No. 112,978, dated March 21, 1871.

IMPROVEMENT IN HINGES FOR SEWING-MACHINES.

The Schedule referred to in these Letters Patent and making part of the same.

I, ROSWELL H. ST. JOHN, of Bellefontaine, in the county of Logan and State of Ohio, have invented an Improved Hinge for Sewing-Machines, of which the following is a specification.

Nature and Objects of the Invention.

My invention relates to means for hinging the works of a sewing-machine or the machine proper to its table, to facilitate turning it back and at the same time furnishing it an elastic support.

For this purpose I construct a loose pintle-hinge, with its central socket or sockets enlarged, and provided with sleeves or bushings of rubber or gum, lined and covered at ends with metal facings. The rubber or gum furnishes the elastic support in all directions, the metallic facings smooth and rigid frictional surfaces.

Description of the Accompanying Drawing.

The two figures represent a hinge in open position, constructed according to my invention.

Like letters of reference indicate corresponding parts.

Figure 1:
Figure 1 is a transverse section on the line $z\ z$, fig. 2.
Figure 2:
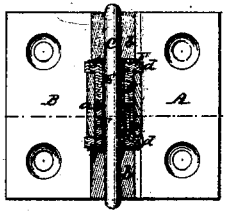
Figure 2 is in part a face view and in part a longitudinal section on the line $y\ y$, fig. 1.

General Description.

To provide a simple and efficient hinge connection and elastic support combined for the top or works of a sewing-machine, I make a loose pintle-hinge, composed of leaves A B of any approved shape, and a cylindrical or conical pintle, C, of any suitable material, enlarging the bore, and consequently the diameter of the central socket $a$, or each of such sockets if there are more than one, and preferably the diameter of the other sockets $b$ to correspond.

Within the said central socket $a$ I arrange bushings D of rubber or elastic gum, made with circumferential flanges $d$ to cover the ends of said socket.

Thin metal tubes E and washers F face the interior and ends of the said bushings, and form the bearing surfaces of the socket to which applied.

The pintle fits and may be locked in the other sockets $b$ in any usual manner.

The bushings D and lining-tubes E are made separate, to facilitate the insertion of the latter in the former and of the lined bushings in the socket, and also, in the case of the tubes, to adapt them to collapse with the bushings.

The facing-washers F may be separate, as shown, or formed on or attached to the said tubes E.

It will be seen that the bushings D, with their flanges $d$, completely isolate the two leaves of the hinge-and-cushion movement in every direction, while the tubes E and washers F give smooth metallic frictional surfaces.

I do not claim, broadly, the application of a rubber washer to a butt-hinge.

Claim.

I claim as my invention—

A hinge for sewing-machines, having a central socket, $a$, enlarged, and provided with flanged elastic bushings D $d$ D $d$, and metallic facings E F for the same, constructed, applied, and operating substantially as and for the objects herein set forth.

ROSWELL H. ST. JOHN.

Witnesses:
PHILANDER JONES,
LEWIS TAYLOR.